United States Patent
Kalaf et al.

(10) Patent No.: US 10,394,630 B2
(45) Date of Patent: Aug. 27, 2019

(54) ESTIMATING RELATIVE DATA IMPORTANCE IN A DISPERSED STORAGE NETWORK

(71) Applicant: International Business Machines Corporation, Armonk, NY (US)

(72) Inventors: Dennis A. Kalaf, San Francisco, CA (US); Asimuddin Kazi, Naperville, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 370 days.

(21) Appl. No.: 15/334,899

(22) Filed: Oct. 26, 2016

(65) Prior Publication Data

US 2018/0115617 A1    Apr. 26, 2018

(51) Int. Cl.
*H04L 29/08* (2006.01)
*G06F 11/00* (2006.01)
*G06F 16/182* (2019.01)

(52) U.S. Cl.
CPC ............ *G06F 11/00* (2013.01); *G06F 16/182* (2019.01); *H04L 67/1097* (2013.01)

(58) Field of Classification Search
CPC .... G06F 11/00; G06F 17/30194; G06F 3/067; G06F 11/1076; G06F 3/0619; G06F 3/064; H04L 67/1097
USPC ........................................................ 709/223
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Tu T Nguyen
(74) *Attorney, Agent, or Firm* — Garlick & Markison; Timothy W. Markison; Harry S. Tyson, Jr.

(57) ABSTRACT

Methods for use in a dispersed storage network (DSN) to determine relative importance of data objects stored in the DSN for use in making prioritization decisions relating to necessary rebuilding of data. In various examples, relative importance rankings are generated based on heuristic measures and explicit ranking factors. The heuristics measures, which may be updated periodically, may include the frequency of access requests relating to a data object, the number of unique requestors of a data object, the age of a data object, the size of a data object, the amount of other data referenced by a data object, and a predicted amount of other data that would be rendered useless or inaccessible should a data object be lost. The explicit ranking factors may include a storage vault identifier and an importance marker associated with a data object. Higher priority data is preferably rebuilt prior to lower priority data.

20 Claims, 7 Drawing Sheets

(56) References Cited

U.S. PATENT DOCUMENTS

| | | | |
|---|---|---|---|
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122117 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2016/0321136 | A1* | 11/2016 | Baptist .................. G06F 3/067 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

ESTIMATING RELATIVE DATA IMPORTANCE IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks, and more particularly to coordination of potentially harmful maintenance actions in a dispersed storage network.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

DETAILED DESCRIPTION OF THE INVENTION

Figure 1:
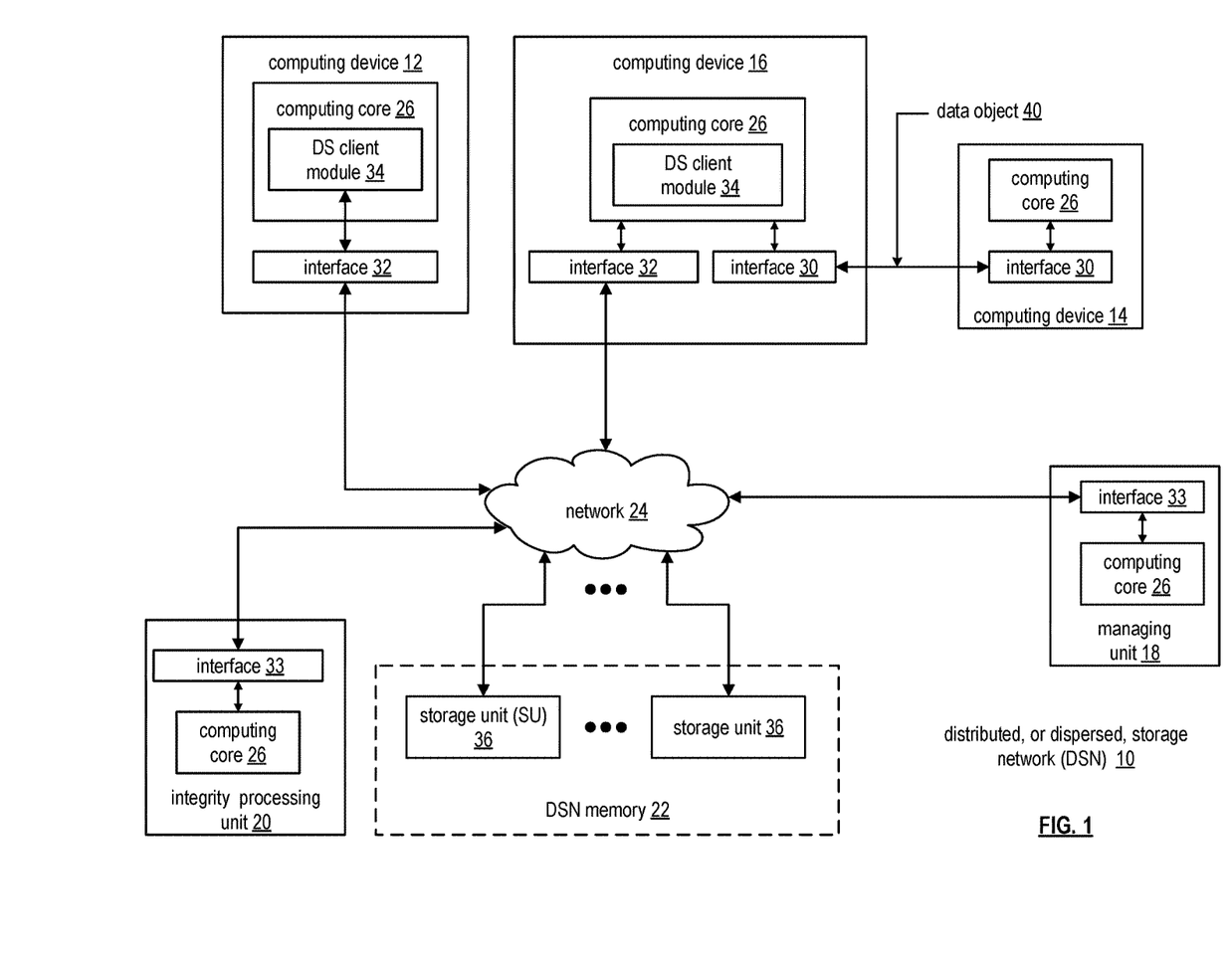
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
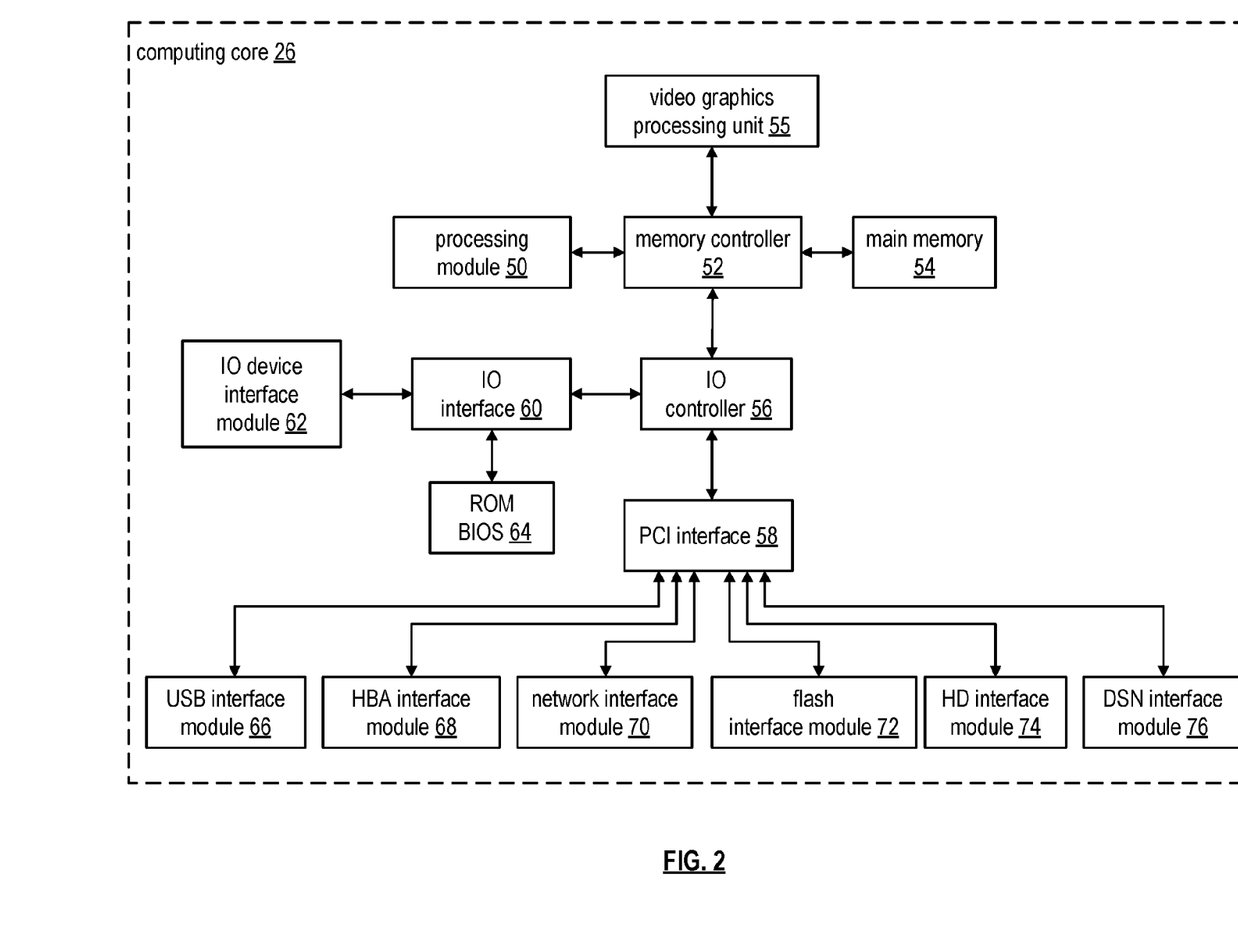
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding of data slices, updating hardware, rebooting software, restarting a particular software process, performing an upgrade, installing a software patch, loading a new software revision, performing an off-line test, prioritizing tasks associated with an online test, etc.), etc.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36. Examples of estimating the relative importance of stored data for using in prioritizing rebuilding of data slices is discussed in greater detail with reference to FIGS. 9-11.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figure 3:
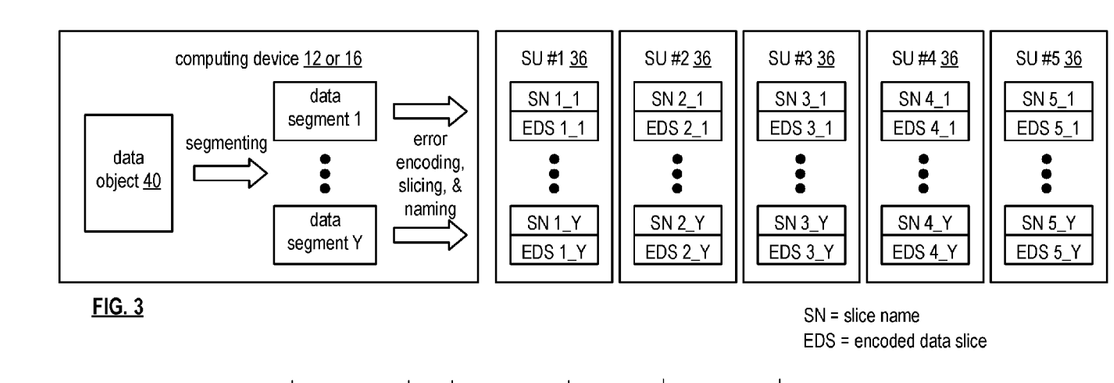
FIG. 3 is a schematic block diagram of an example of dispersed storage error encoding of data in accordance with the present disclosure.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figures 4, 5:
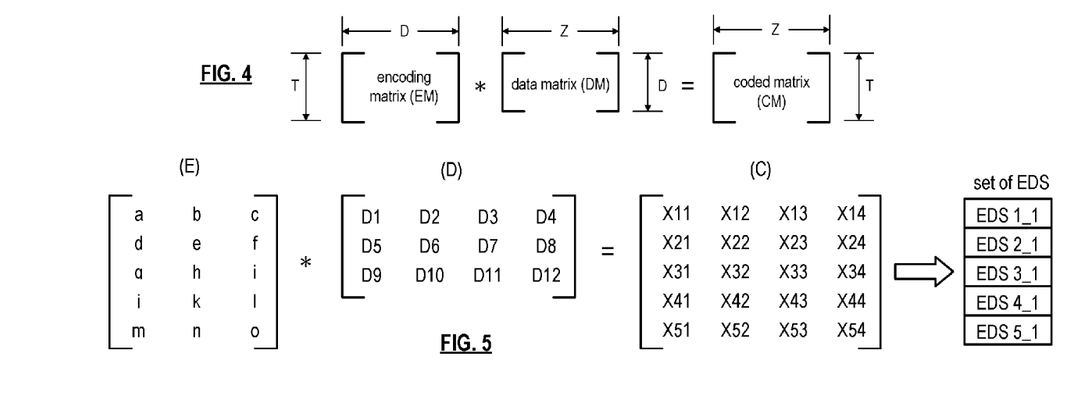
FIG. 4 is a schematic block diagram of a generic example of an error encoding function in accordance with the present disclosure.
FIG. 5 is a schematic block diagram of a specific example of an error encoding function in accordance with the present disclosure.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Figure 6:
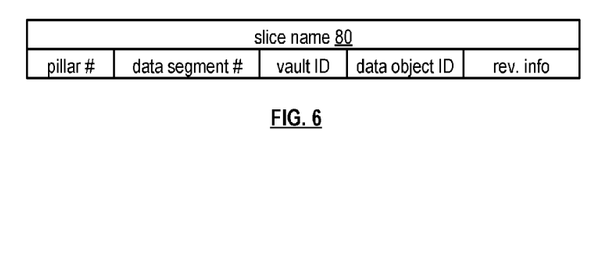
FIG. 6 is a schematic block diagram of an example of slice naming information for an encoded data slice (EDS) in accordance with the present disclosure.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
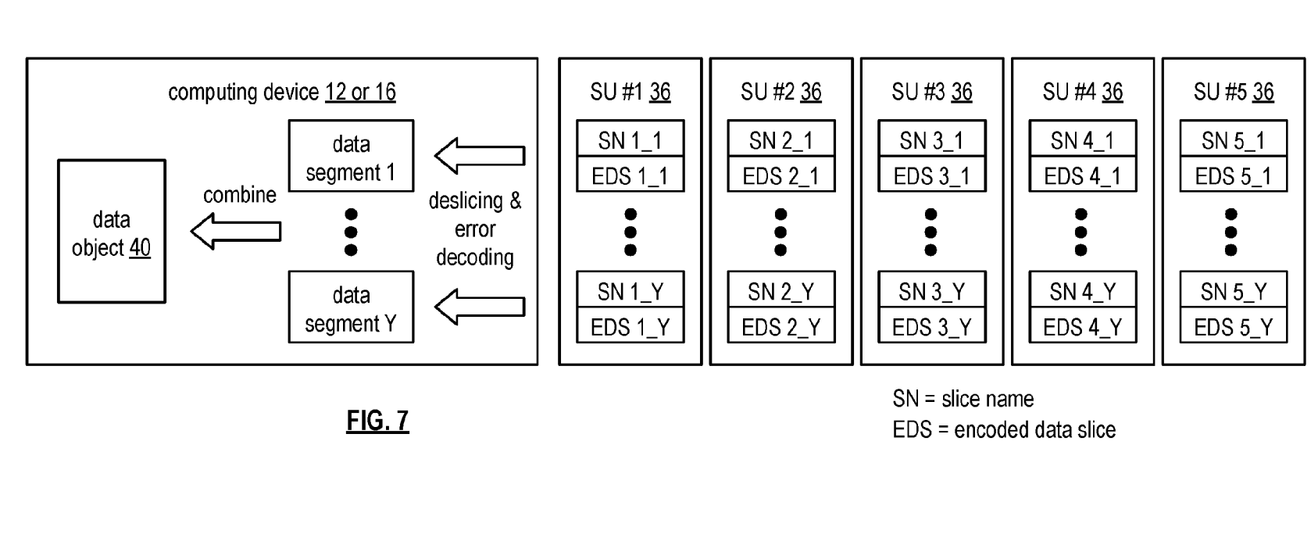
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
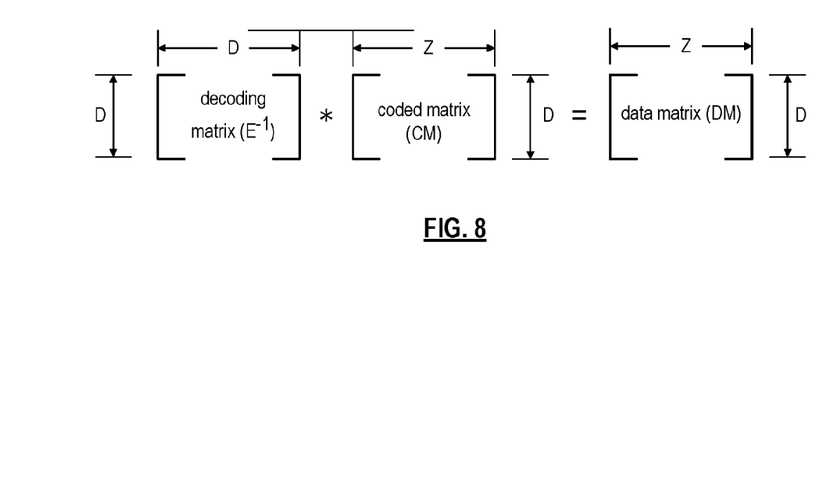
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In a dispersed storage network, it is natural for some stored data (also referred to herein as "data objects") to be of greater importance than other stored data. Often, the relative importance of a given piece of data is a dynamic property that evolves over time. Knowing the relative importance of data is useful when making prioritization decisions relating to rebuilding of data, so that loss of the most important data can be made less likely. As described more fully in the novel examples below, DSN memory/processing module(s) prioritize rebuild operations by first estimating data importance using a number of heuristic measures or explicit ranking factors (collectively referred to herein as "ranking factors"). The explicit ranking factors may include storage vault/container identification information and/or importance information associated with data objects (e.g., certain data object may be explicitly marked or flagged as having a higher relative importance), while the heuristic measures may include information such as the frequency of data object access, the number of unique requestors/readers of a data object, the age of data, the size of data, the amount of other data referenced by a particular data object (e.g., is it an index node or high up in the data hierarchy?), how much other data would be rendered useless, inaccessible, meaningless if a particular data object were lost (e.g., is it an encryption key that encrypts a lot of other data?), etc.

As many of the heuristic measures can change over time, the estimated importance of data may likewise change over time. Accordingly, new measurements/assessments may be performed on ranking factors in order to update the estimated importance of a particular data object. For example, a data object may be accessed less frequently over time. The importance estimates/rankings are stored within the metadata object for each data object in the DSN memory. When a rebuilding module detects missing or corrupted slices, it may determine the estimated importance of the data object with which the lost slices are associated. This importance ranking is then used to determine the level of priority these slices will receive in terms of rebuilding. Slices given a higher priority ranking in rebuilding will preferentially be rebuilt prior to other lower priority slices.

Figure 9:
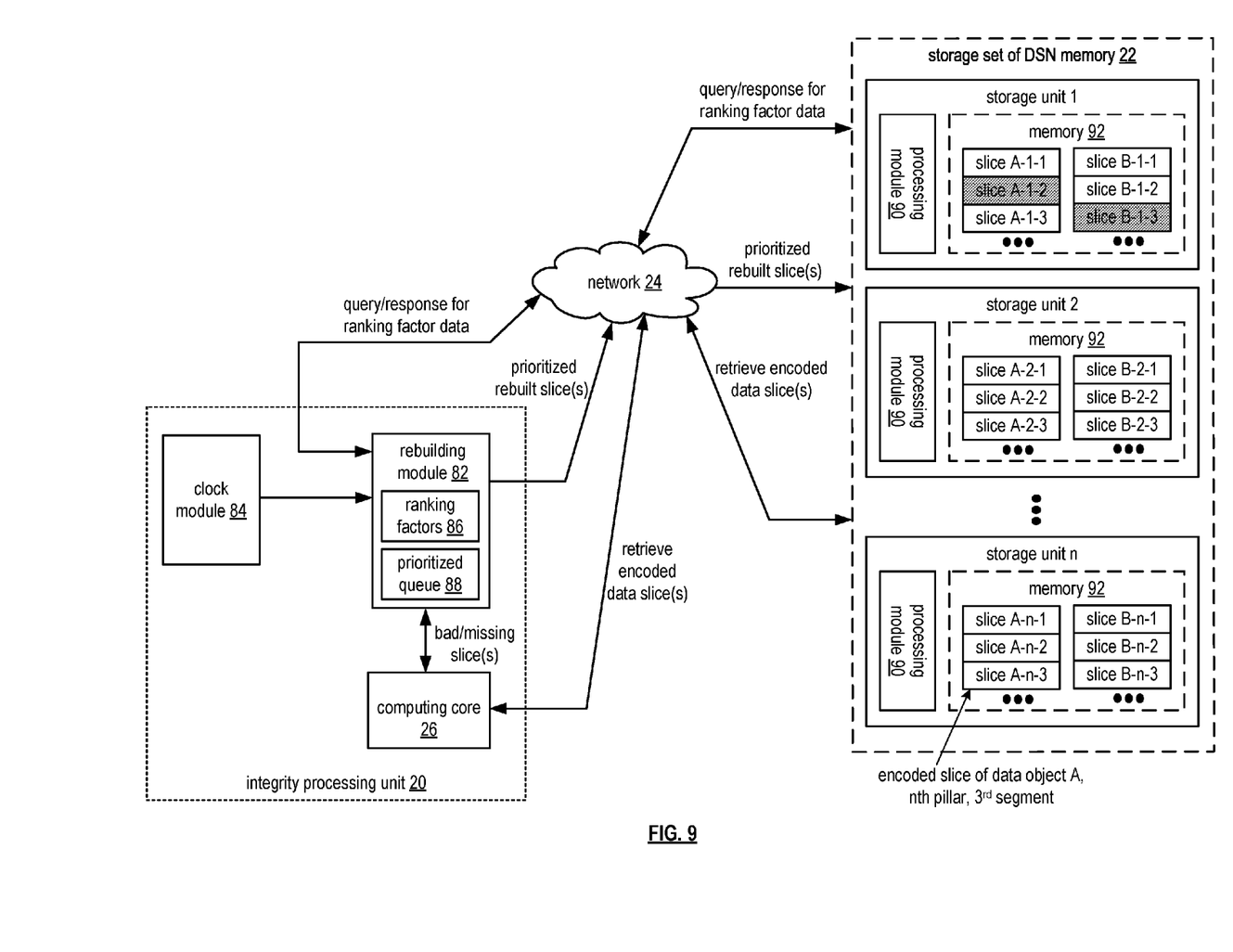
FIG. 9 is a schematic block diagram of an example of a DSN performing prioritized rebuilding of encoded data slices in accordance with the present disclosure.

Referring more particularly to FIG. 9, a schematic block diagram of an example of a DSN performing prioritized rebuilding of encoded data slices in accordance with the present disclosure is shown. The illustrated DSN memory 22 includes a plurality of storage units 1-n (where, for example, n is an integer greater than or equal to three). Each storage unit may be implemented utilizing the storage unit 36 of FIG. 1, and each of the storage units includes a DS client module 34 (not separately illustrated), a processing module 90, and memory 92. The storage units 1-n of this example are configured as a storage set. The storage units of the storage set may be located at a same physical location (site) or located at multiple physical locations without departing from the technology as described herein.

In general, DSN memory 22 stores a plurality of dispersed storage (DS) error encoded data. The DS error encoded data may be encoded in accordance with one or more examples described with reference to FIGS. 3-6, and organized (for example) in slice groupings or pillar groups. The data that is encoded into the DS error encoded data may be of any size and/or of any content. For example, the data may be one or more digital books, a copy of a company's emails, a large-scale Internet search, a video security file, one or more entertainment video files (e.g., television programs, movies, etc.), data files, and/or indexing and key information for use in dispersed storage operations.

In the illustrated embodiment, the DSN further includes the network 24 and integrity processing unit 20 of FIG. 1. The integrity processing unit 20 includes a computer core 26, a rebuilding module 82, and a clock module 84. The rebuilding module 82 further includes a ranking factors module 86 and a prioritized rebuild queue ("prioritized queue") 88. As previously described, the integrity processing unit 20 performs rebuilding of 'bad' or missing encoded data slices. At a high level, the integrity processing unit 20 performs rebuilding by periodically (e.g., using clock module 84) attempting to retrieve/list encoded data slices, and/or slice names of the encoded data slices, from the DSN memory 22. Retrieved encoded slices (or sets of slices) are checked for errors due to data corruption, outdated versioning, etc. If a slice includes an error, it is flagged as a 'bad' or 'corrupted' slice. Encoded data slices that were not received and/or not listed are flagged as missing slices. Corrupted and/or missing slices are subsequently rebuilt (e.g., in a prioritized manner using priority levels) by the rebuilding module 82 using other retrieved encoded data slices that are deemed to be good slices to produce rebuilt slices. The (prioritized) rebuilt slices are then stored in the DSN memory 22.

In an example, after identifying one or more encoded data slices that require rebuilding, the rebuilding module 82 updates the prioritized queue 88 to included queue entries that are prioritized in accordance with retrieved ranking factors data from ranking factors module 86. A queue entry may include, for example, one or more of a slice name, the number of slice errors, a rebuilding task indicator, and identity of the set of slice names that are associated with the slice name (e.g., a source name). While shown as part of rebuilding module 82, prioritized queue 88 can be part of computing core 26, part of DSN memory 22, part of managing unit 18, part of a DS client module 34 or be accessible from separate sources through network 24.

Utilizing the queue entries, the rebuilding module 82 remedies the one or more stored slices in error, either directly or by issuing a rebuilding request to another rebuilding module of the DSN. Rebuilding may include issuing at least a decode threshold number of read slice requests that include slice names associated with the slice(s) that require rebuilding, receiving at least a decode threshold number of read slice responses that includes slices associated with the slice in error, decoding the slices associated with the slice in error to produce a recovered data segment, and encoding the recovered data segment to produce a rebuilt slice. The prioritized rebuilt encoded data slices are then output (via write slice requests) for storage in the DSN memory 22.

In this example, the DSN memory 22 is queried for ranking factor data related to stored data objects. Retrieved ranking factor data is collated and analyzed by the ranking factors module to produce relative importance rankings for the data objects and to assign respective rebuilding priority levels for encoded data slices to be rebuilt. In a further example, ranking factor data may be retrieved from other components of the DSN, such as the managing unit 18 of FIG. 1.

In an example, data object A and data object B are stored in the storage units of the illustrated storage set of DSN memory 22. More particularly, storage unit 1 stores encoded slices of data object A for a first pillar and encoded data slices of data object B for a first pillar, storage unit 2 stores encoded data slices of data object A for a second pillar and encoded data slices of data object B for a second pillar, etc. In this example, slice A-1-2 of data object A and slice B-1-3 of data object B, both of which are stored in storage unit 1, are identified as corrupted or missing slices that require rebuilding. If the ranking factor data indicates that data object A has a higher relative importance ranking as compared to data object B, rebuilding of slice A-1-2 will be assigned a higher rebuilding priority level than slice B-1-3.

Figure 10:
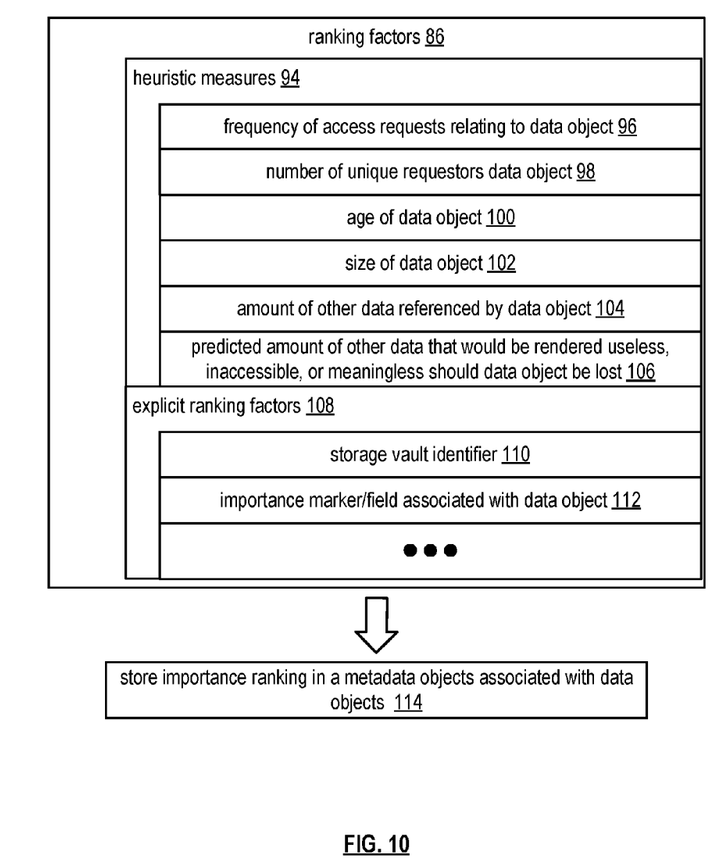
FIG. 10 is a schematic block diagram of exemplary ranking factors for use estimating the relative importance of data in a DSN in accordance with the present disclosure.

FIG. 10 is a schematic block diagram of exemplary ranking factors for use estimating the relative importance of data objects in a DSN in accordance with the present disclosure. More particularly, the ranking factors 86 for a particular data object may include a variety of heuristic measures 94 and explicit ranking factors 108. The heuristic measures 94, which as previously noted may change over time, include: frequency of access requests relating to a data object 96, the number of unique requestors for a data object 98, the age of a data object 100, the size of a data object 102, the amount of other data referenced by a particular data object 104, the predicted amount of other data that would be rendered useless, inaccessible, or meaningless should a particular data object be lost 106, etc. Such heuristic measures 94 may be updated on a periodic basis.

Various explicit ranking factors 108 may also be employed in determining the relative importance of data objects stored in the DSN. Such explicit ranking factors 108, which tend to be relatively static over time, may include a storage vault identifier 110 indicating the particular storage vault or container in which encoded data slices of a data object are stored. For example, certain storage vaults may be dedicated to storage of relatively important data, such as indexing data or encryption/encoding key data, and thus will generally be prioritized in rebuilding operations. Information from an importance marker/field associated with a data object 112 (or like indicator) may likewise be employed in determining the relative importance of a particular data object. For a given data object stored in the DSN, the results of importance estimation operations involving one or more ranking factors 86 such as those described above may be stored in a metadata object associated with the data object as shown in block 114.

Figure 11:
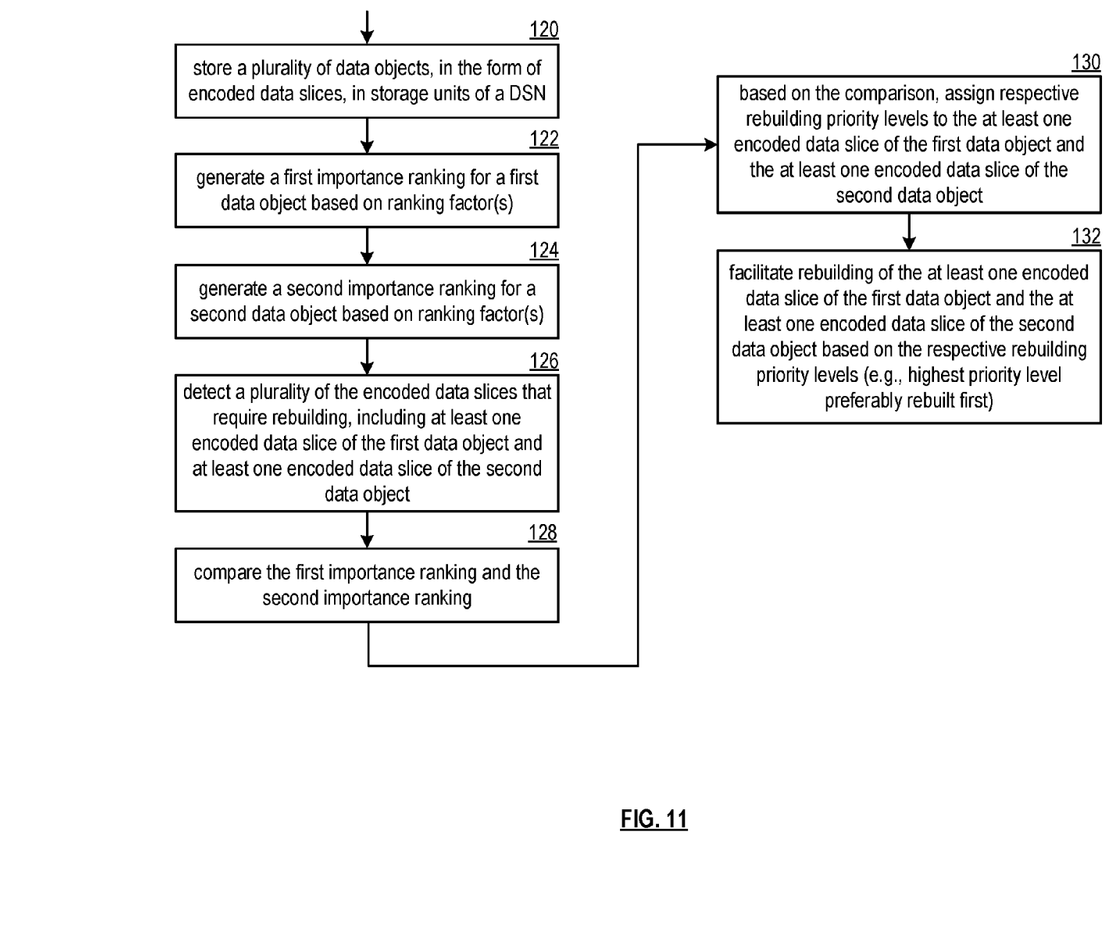
FIG. 11 is a logic diagram illustrating an example of estimating the relative importance of data in a DSN in accordance with the present disclosure.

FIG. 11 is a logic diagram illustrating an example of estimating the relative importance of data in a DSN in accordance with the present disclosure. In this example, the method begins or continues at a step 120 where a plurality of data objects, in the form encoded data slices, are stored in storage units of a DSN. Next, at step 122, a processing module (e.g., of a storage unit 36 or managing unit 18) generates a first importance ranking for a first data object based on one or more ranking factors. The method continues at step 124 where the processing module generates a second importance ranking for a second data object based on one or more ranking factors (additional importance rankings may further be generated for additional data objects).

The method continues at step 126, where a processing module (e.g., of integrity processing unit 20) detects a plurality of the encoded data slices that require rebuilding. The encoded data slices may include, for example, at least one encoded data slice of the first data object and at least one encoded data slice of the second data object. Next, at step 128, a processing unit compares the first importance ranking and the second importance ranking and, based on the comparison, assigns (step 130) respective rebuilding priority levels to the at least one encoded data slice of the first data object and the at least one encoded data slice of the second data object. The method continues at step 132 where the processing module facilitates rebuilding of the at least one encoded data slice of the first data object and the at least one encoded data slice of the second data object based, at least in part, on the respective rebuilding priority levels. For example, the highest priority data slices are rebuilt first (as permitted by available system resources), followed by the next highest priority data slices, etc.

The method described above in conjunction with the integrity processing unit 20 and storage units can alternatively be performed by other modules (e.g., DS client modules 34) of a dispersed storage network or by other devices (e.g., managing unit 20). Any combination of a first module, a second module, a third module, a fourth module, etc. of the computing devices and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN) having a plurality of storage units, the plurality of storage units storing a plurality of data objects in the form of encoded data slices, the method comprises:
generating a first importance ranking for a first data object of the plurality of data objects;
generating a second importance ranking for a second data object of the plurality of data objects, the first importance ranking and the second importance ranking based on one or more ranking factor;
detecting a plurality of the encoded data slices that require rebuilding, wherein each encoded data slice of the plurality of the encoded data slices is a dispersed storage error encoded portion of a respective one of the plurality of data objects, and wherein the plurality of the encoded data slices that require rebuilding include at least one encoded data slice of the first data object and at least one encoded data slice of the second data object;
performing a comparison of the first importance ranking and the second importance ranking; and
based on the comparison, assigning respective rebuilding priority levels to the at least one encoded data slice of the first data object and the at least one encoded data slice of the second data object.

2. The method of claim 1, wherein the first importance ranking and the second importance ranking vary over time, and wherein the one or more ranking factor includes a heuristic measure.

3. The method of claim 2, wherein the heuristic measure includes at least one of: the frequency of access requests relating to a particular data object, the number of unique requestors of a particular data object, the age of a particular data object, or the size of a particular data object.

4. The method of claim 2, wherein the heuristic measure includes the amount of other data referenced by a particular data object.

5. The method of claim 2, wherein the heuristic measure predicts the amount of other data that would be rendered useless or inaccessible should a particular data object be lost.

6. The method of claim 1, wherein the one or more ranking factor includes an explicit ranking factor.

7. The method of claim 6, wherein the explicit ranking factor includes at least one of a storage vault identifier or an importance marker associated with a particular data object.

8. The method of claim 1, wherein the at least one encoded data slice of the first data object and the at least one encoded data slice of the second data object are stored in a common storage unit.

9. The method of claim 1 further comprises:
facilitating rebuilding of the at least one encoded data slice of the first data object and the at least one encoded data slice of the second data object based on the respective rebuilding priority levels.

10. The method of claim 1 further comprises:
storing the first importance ranking in a metadata object associated with the first data object; and
storing the second importance ranking in a metadata object associated with the second data object.

11. The method of claim 10 further comprises:
updating the first importance ranking and the second importance ranking on a periodic basis.

12. A method for execution by one or more processing modules of one or more computing devices of a dispersed storage network (DSN) having a plurality of storage units, the plurality of storage units storing a plurality of data objects in the form of encoded data slices, the method comprises:
generating a first importance ranking for a first data object of the plurality of data objects;
generating a second importance ranking for a second data object of the plurality of data objects, the first importance ranking and the second importance ranking based on at least one heuristic measure and at least one explicit ranking factor;
detecting a plurality of the encoded data slices that require rebuilding, wherein each encoded data slice of the plurality of the encoded data slices is a dispersed storage error encoded portion of a respective one of the plurality of data objects, and wherein the plurality of the encoded data slices that require rebuilding include at least one encoded data slice of the first data object and at least one encoded data slice of the second data object;
performing a comparison of the first importance ranking and the second importance ranking;
based on the comparison, assigning a higher rebuilding priority level to the at least one encoded data slice of the first data object or the at least one encoded data slice of the second data object; and
facilitating rebuilding of the at least one encoded data slice of the first data object and the at least one encoded data slice of the second data object based on the higher rebuilding priority level.

13. The method of claim 12, wherein the heuristic measure includes at least one of: the frequency of access requests relating to a particular data object, the number of unique requestors of a particular data object, the age of a particular data object, or the size of a particular data object.

14. The method of claim 12, wherein the at least one encoded data slice of the first data object and the at least one encoded data slice of the second data object are stored in a common storage unit.

15. A computing device of a group of computing devices of a dispersed storage network (DSN) having a plurality of storage units, the computing device comprises:
a network interface;
a local memory; and
a processing module operably coupled to the network interface and the local memory, wherein the processing module operates to:

generate a first importance ranking for a first data object of the plurality of data objects;

generate a second importance ranking for a second data object of the plurality of data objects, the first importance ranking and the second importance ranking based on one or more ranking factor;

detect, via the network interface, a plurality of the encoded data slices that require rebuilding, wherein each encoded data slice of the plurality of the encoded data slices is a dispersed storage error encoded portion of a respective one of the plurality of data objects, and wherein the plurality of the encoded data slices that require rebuilding include at least one encoded data slice of the first data object and at least one encoded data slice of the second data object;

perform a comparison of the first importance ranking and the second importance ranking; and based on the comparison, assign respective rebuilding priority levels to the at least one encoded data slice of the first data object and the at least one encoded data slice of the second data object.

16. The computing device of claim 15, wherein the first importance ranking and the second importance ranking vary over time, and wherein the one or more ranking factor includes a heuristic measure.

17. The computing device of claim 16, wherein the heuristic measure includes at least one of: the frequency of access requests relating to a particular data object, the number of unique requestors of a particular data object, the age of a particular data object, or the size of a particular data object.

18. The computing device of claim 16, wherein the heuristic measure includes the amount of other data referenced by a particular data object.

19. The computing device of claim 16, wherein the one or more ranking factor further includes an explicit ranking factor.

20. The computing device of claim 15, wherein the processing module further operates to:
facilitate, via the network interface, rebuilding of the at least one encoded data slice of the first data object and the at least one encoded data slice of the second data object based on the respective rebuilding priority levels.

* * * * *